US010088023B2

(12) United States Patent
Tamura

(10) Patent No.: US 10,088,023 B2
(45) Date of Patent: Oct. 2, 2018

(54) FLAT BELT, BELT MECHANISM, BELT LIFTING MECHANISM, ATTACHMENT METHOD, AND METHOD FOR MANUFACTURING FLAT BELT

(71) Applicant: Mitsuboshi Belting Ltd., Kobe-shi, Hyogo (JP)

(72) Inventor: Eiki Tamura, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 0 days.

(21) Appl. No.: 15/521,700

(22) PCT Filed: Oct. 30, 2015

(86) PCT No.: PCT/JP2015/080762
§ 371 (c)(1),
(2) Date: Apr. 25, 2017

(87) PCT Pub. No.: WO2016/068296
PCT Pub. Date: May 6, 2016

(65) Prior Publication Data
US 2017/0248208 A1    Aug. 31, 2017

(30) Foreign Application Priority Data

Oct. 31, 2014 (JP) ................................ 2014-222612
Oct. 27, 2015 (JP) ................................ 2015-210764

(51) Int. Cl.
*B65G 17/00* (2006.01)
*F16H 19/06* (2006.01)
(Continued)

(52) U.S. Cl.
CPC ............. *F16H 19/06* (2013.01); *B65G 15/42* (2013.01); *F16G 3/08* (2013.01); *F16H 2019/0668* (2013.01); *F16H 2019/0686* (2013.01)

(58) Field of Classification Search
CPC ....... B65G 15/30; B29C 66/4324; F16G 3/00; F16G 1/00; F16G 3/07; Y10T 24/16; Y10T 24/1672; Y10T 24/168; Y10T 24/1684
(Continued)

(56) References Cited

U.S. PATENT DOCUMENTS 5,549,133 A * 8/1996 Sigelakis ................ E03L 39/06
137/296
5,979,639 A * 11/1999 Sytema .................. B65G 17/42
198/731

(Continued)

FOREIGN PATENT DOCUMENTS

CN    2660467 Y    12/2004
CN    102123924 A    7/2011
(Continued)

OTHER PUBLICATIONS

Aug. 8, 2017—(JP) Decision of Refusal—App 2015-210764.
(Continued)

*Primary Examiner* — James R Bidwell
(74) *Attorney, Agent, or Firm* — Banner & Witcoff, Ltd.

(57) ABSTRACT

The present invention relates to a flat belt (10) that is an open end belt to be fixed to a coupler (31, 41), in which the flat belt (10) contains, formed on both end portions (11, 12) of at least one surface of the flat belt (10), a plurality of projected portions (13) engageable with a plurality of recessed portions (33, 43) formed on the coupler (31, 41).

6 Claims, 16 Drawing Sheets

(51) Int. Cl.
B65G 15/42 (2006.01)
F16G 3/08 (2006.01)
(58) Field of Classification Search
USPC .................................................... 198/844.2
See application file for complete search history.

(56) References Cited

U.S. PATENT DOCUMENTS

| | | | |
|---|---|---|---|
| 6,216,849 B1 | 4/2001 | Sytema | |
| 6,264,579 B1 | 7/2001 | Odai et al. | |
| 6,820,309 B1 * | 11/2004 | Gersbach | F16G 3/08 198/844.2 |
| 7,810,637 B2 | 10/2010 | Gundlach | |
| 8,720,675 B2 * | 5/2014 | Gentz | B65G 15/34 198/844.1 |
| 2008/0060171 A1 * | 3/2008 | Lindemann | F16G 3/08 24/31 R |
| 2010/0018842 A1 | 1/2010 | Gundlach | |
| 2013/0143705 A1 | 6/2013 | Wolf | |

FOREIGN PATENT DOCUMENTS

| | | | |
|---|---|---|---|
| DE | 4405465 A1 | 8/1995 | |
| JP | S52-133487 U | 10/1977 | |
| JP | S61-082153 U | 5/1986 | |
| JP | S61-181750 U | 11/1986 | |
| JP | H03-223545 A | 10/1991 | |
| JP | H04-069433 A | 3/1992 | |
| JP | H08-040669 A | 2/1996 | |
| JP | 2000-081092 A | 3/2000 | |
| JP | 2007-146093 A | 6/2007 | |

OTHER PUBLICATIONS

Jan. 26, 2016—International Search Report—Intl App PCT/JP2015/080762.
Apr. 11, 2017—(JP) Notification of Reasons for Refusal—App 2015-210764.
Mar. 22, 2017—(TW) Office Action—App 104135921.
Dec. 26, 2017—(TW) Office Action—App 104135921.
May 28, 2018—(CA) Office Action—App 2,965,779.
Jul. 4, 2018—(CN) Notification of First Office Action—App 201580059966.5.
Jul. 13, 2018—(KR) Office Action—App 10-2017-7011929.

* cited by examiner

[FIG. 1]
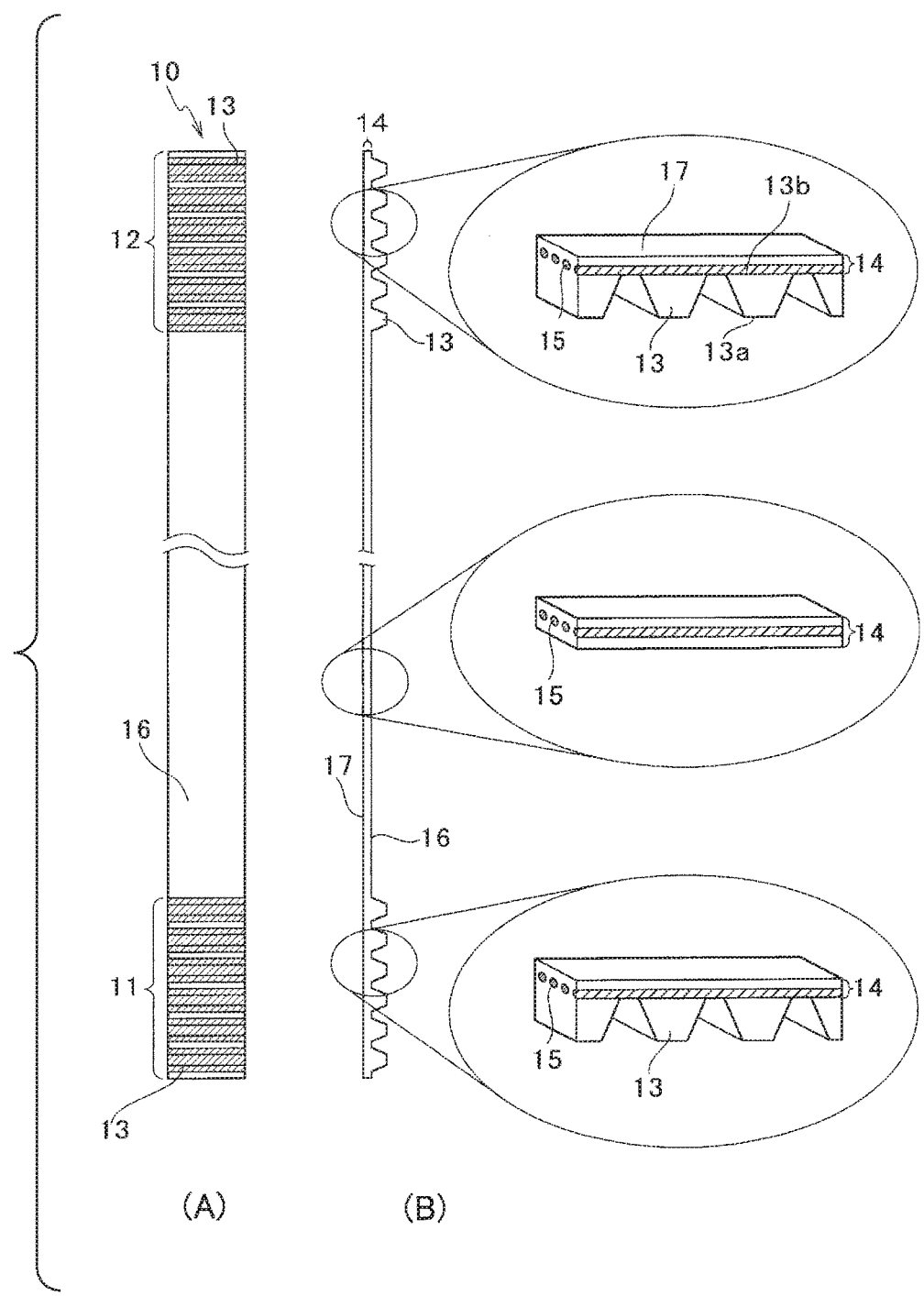

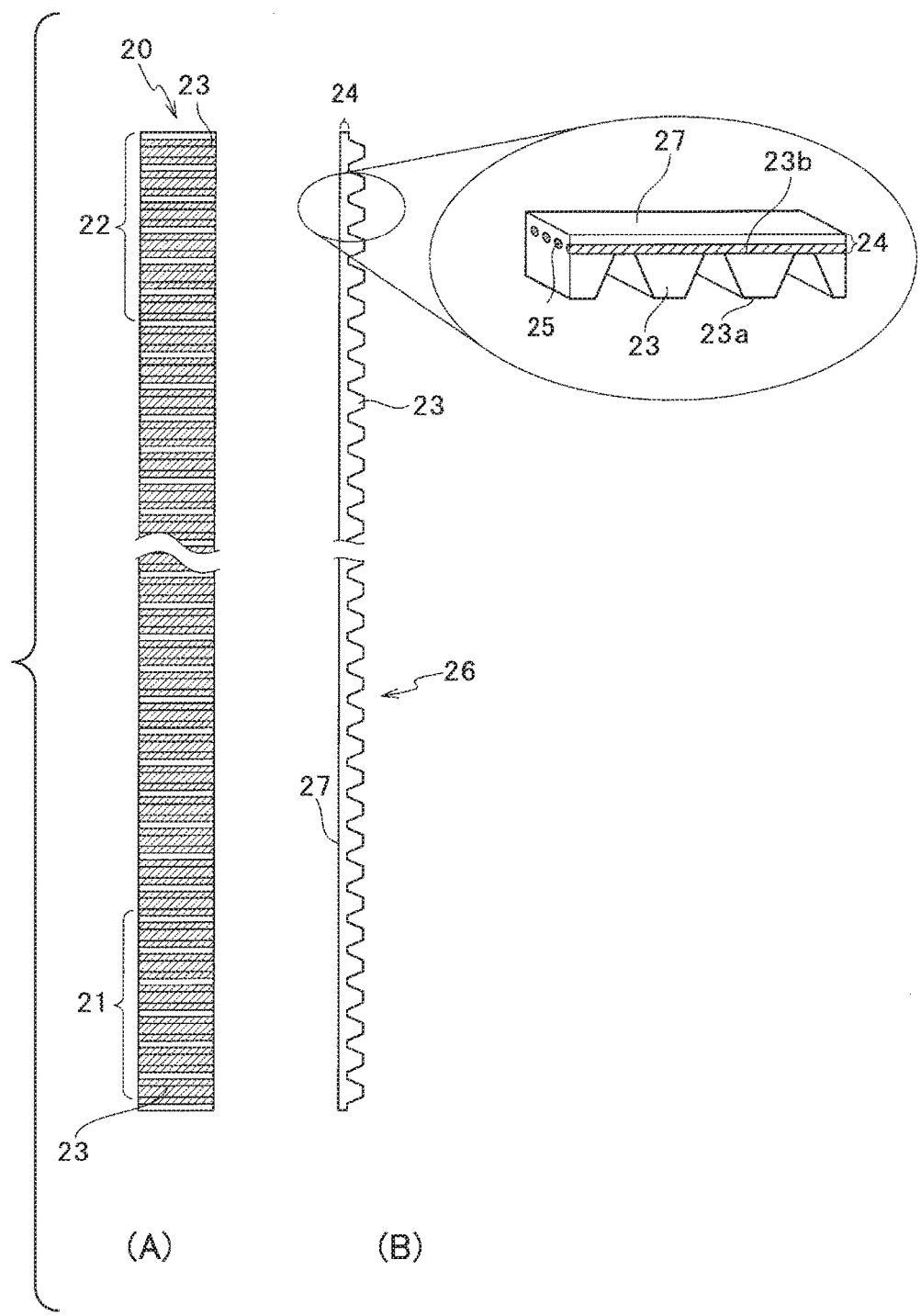
[FIG. 2]

[FIG. 3]
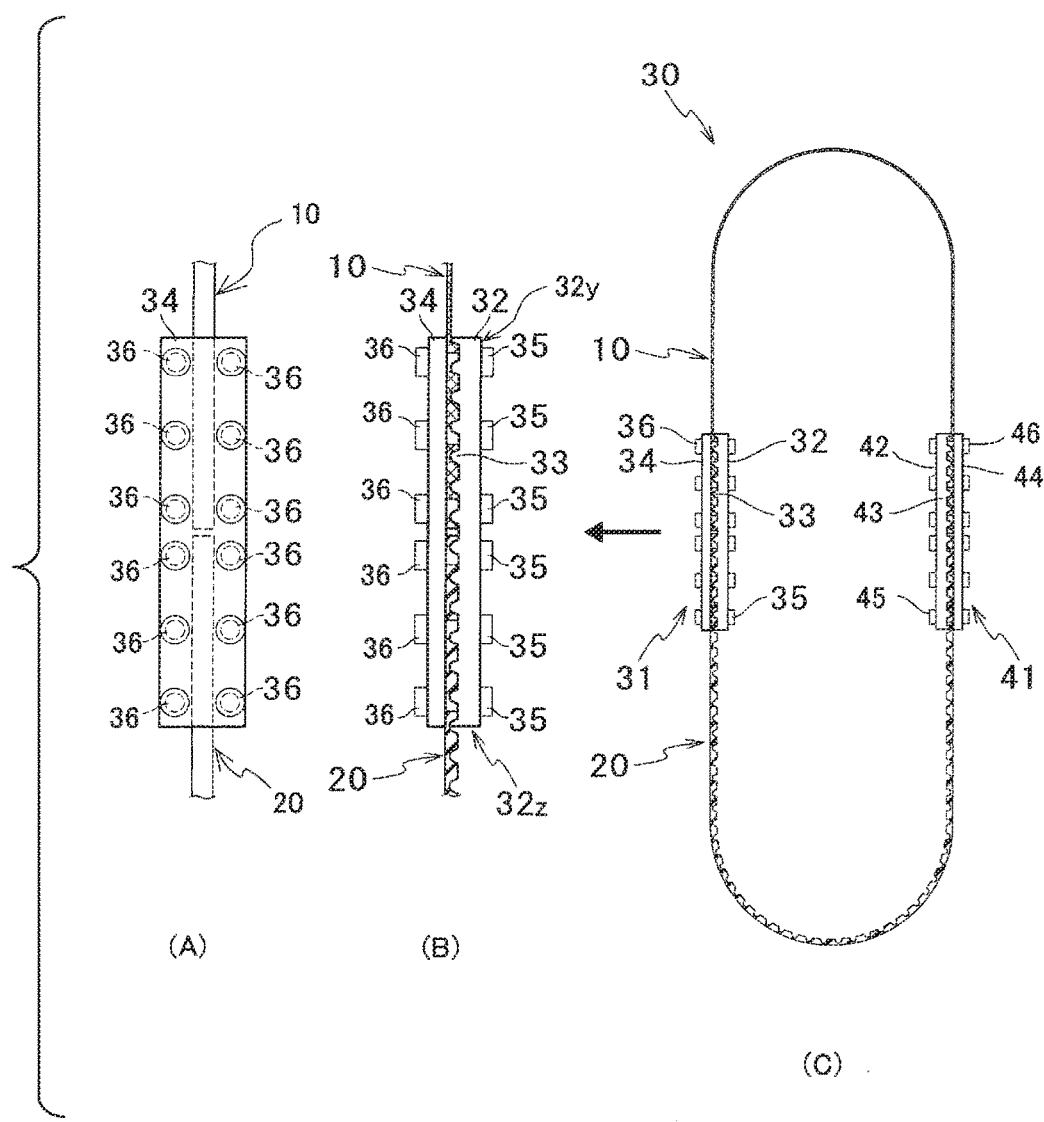

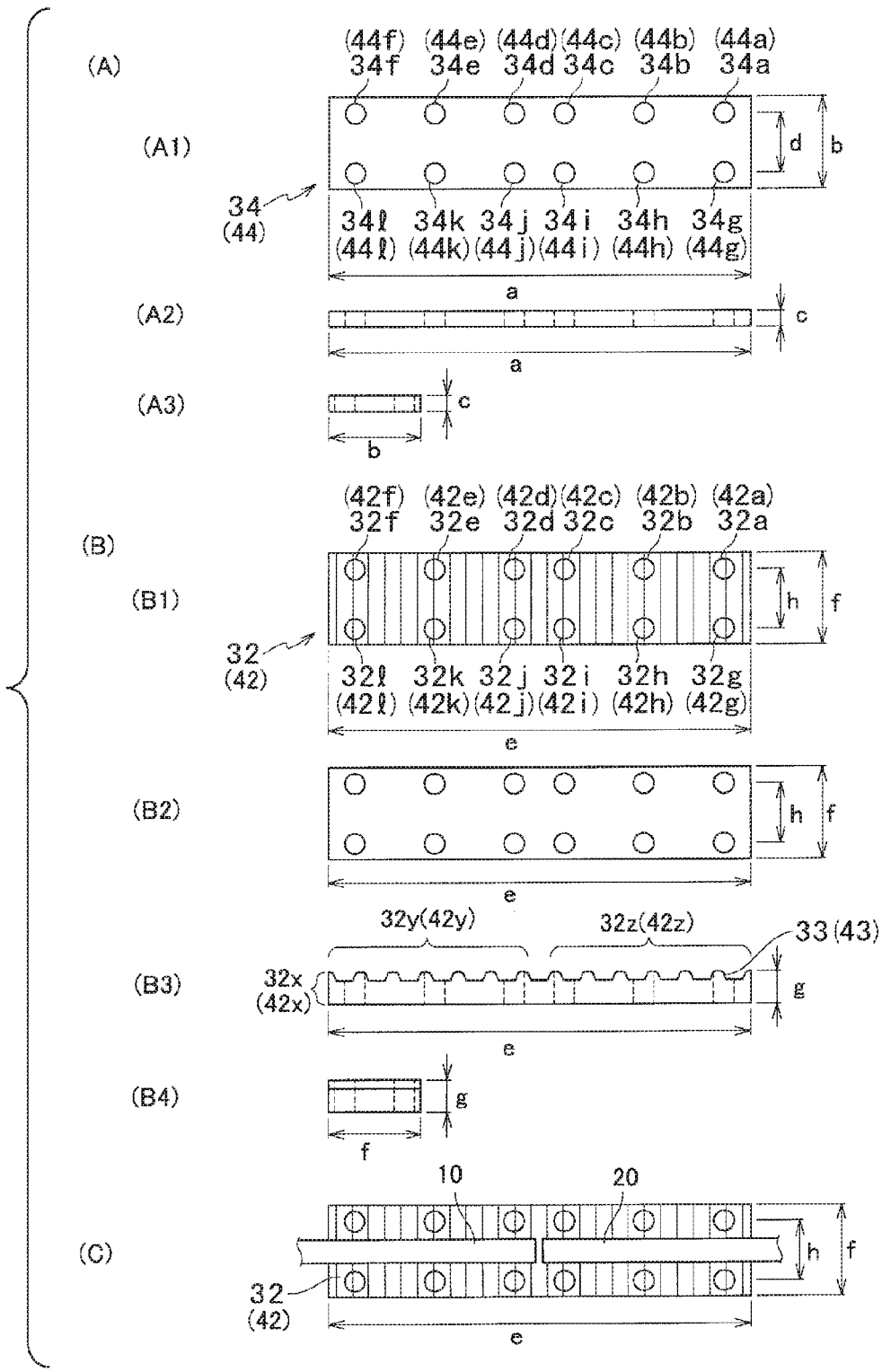

[FIG. 5]
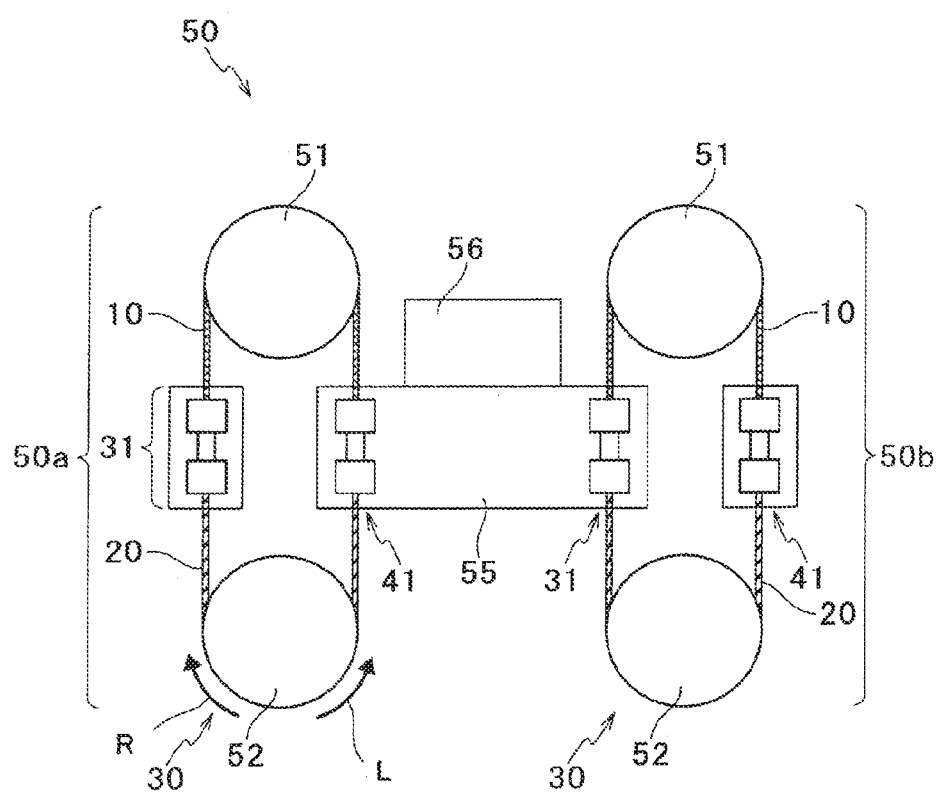

[FIG. 6]
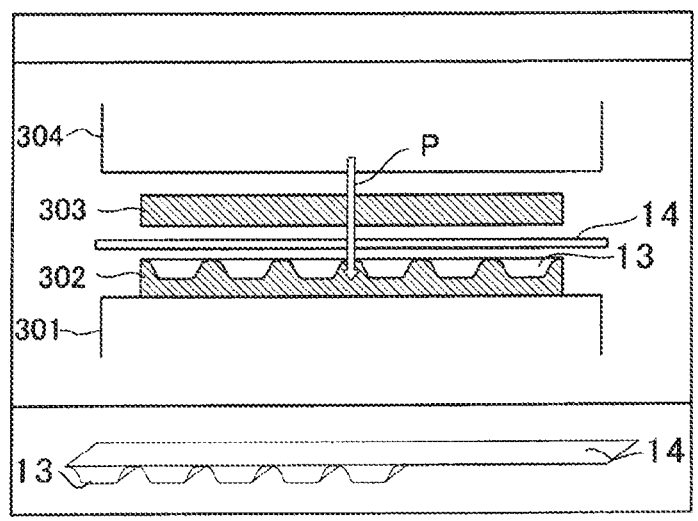

[FIG. 7]
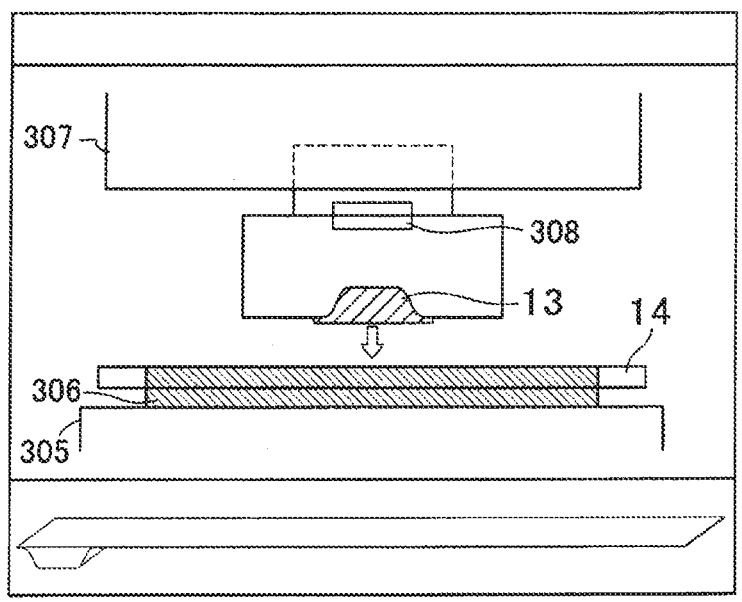

[FIG. 8]
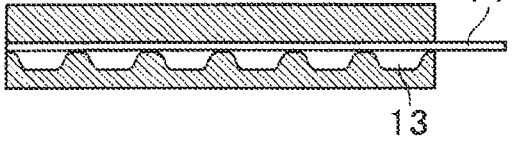

[FIG. 9]
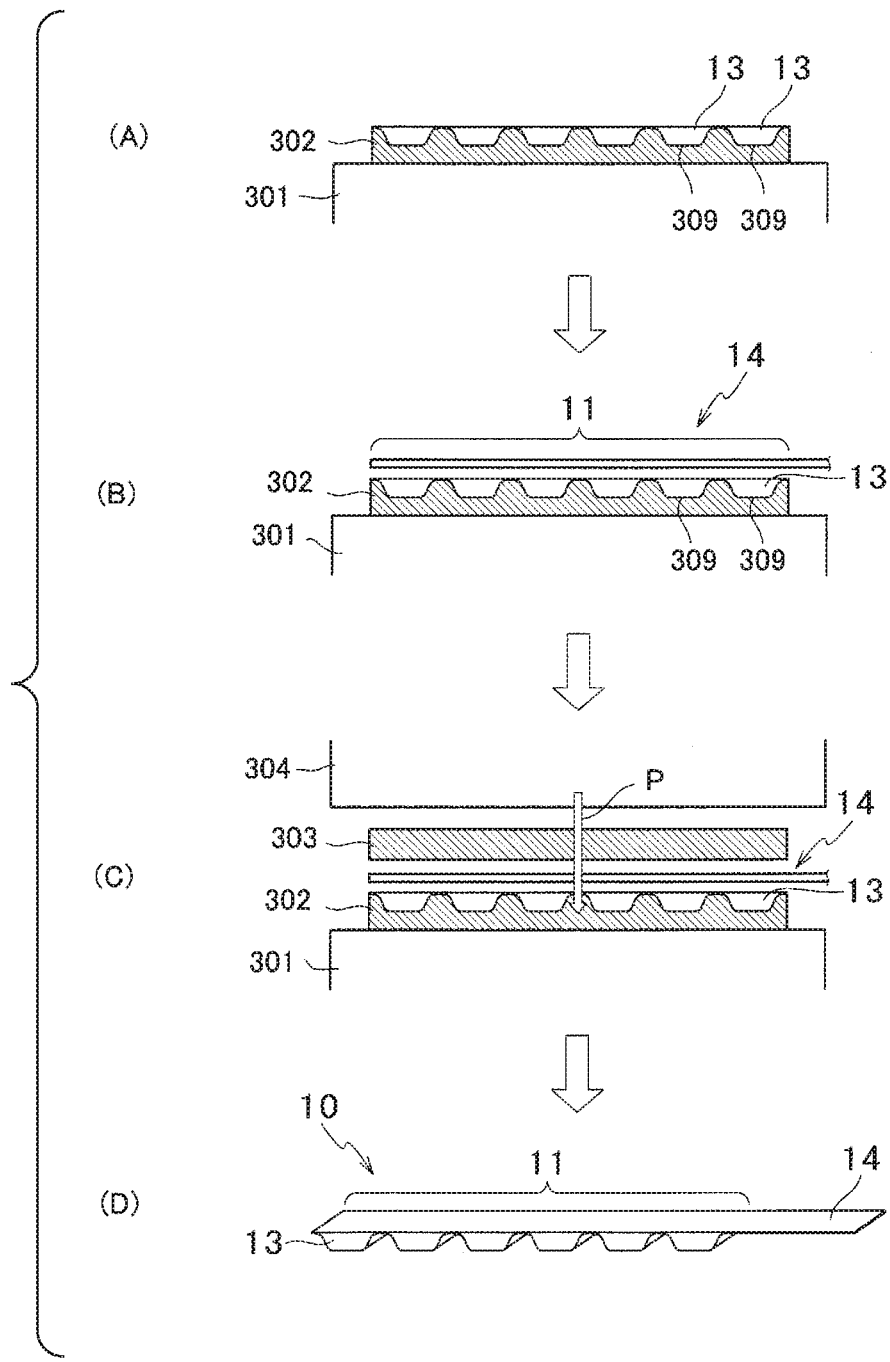

[FIG. 10]
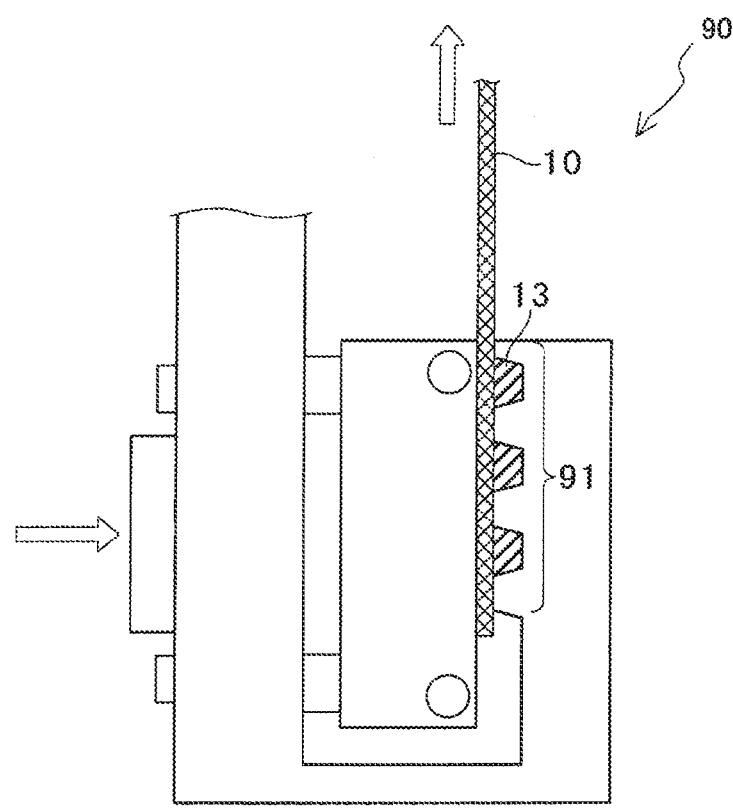

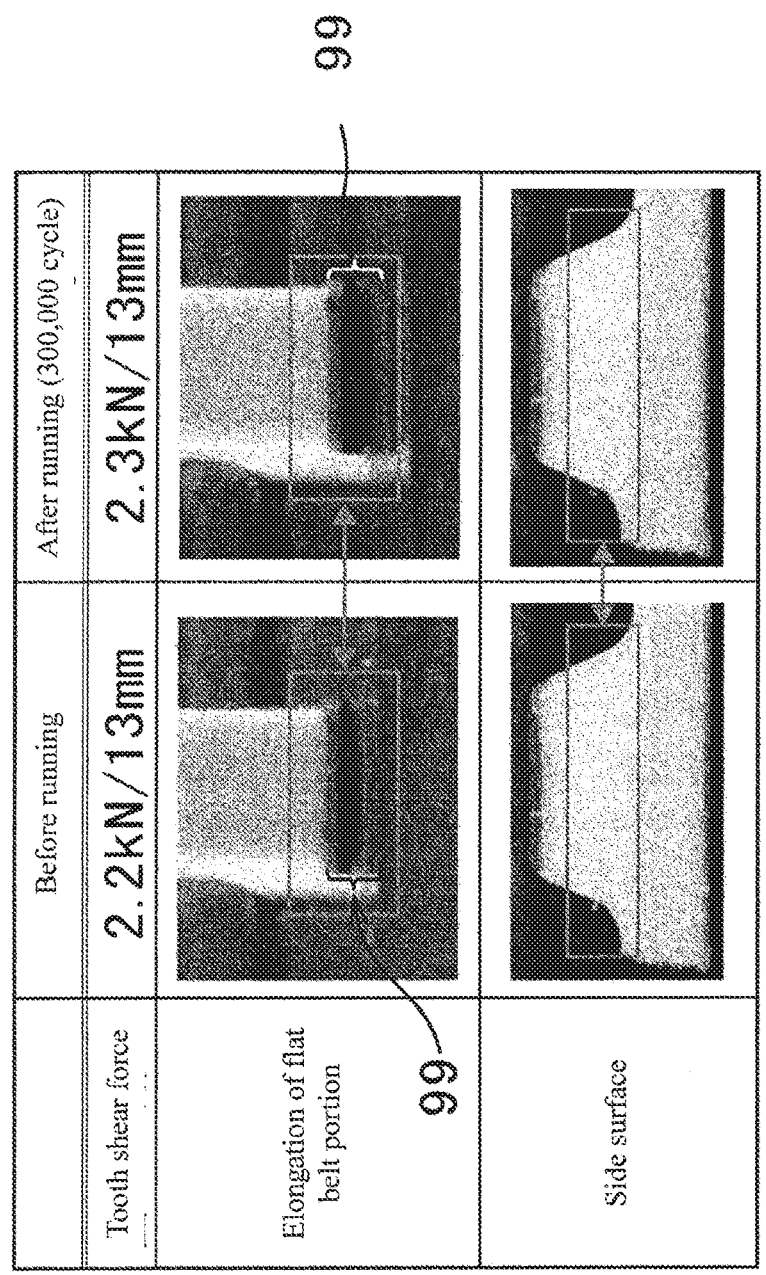
[FIG. 11]

[FIG. 12]
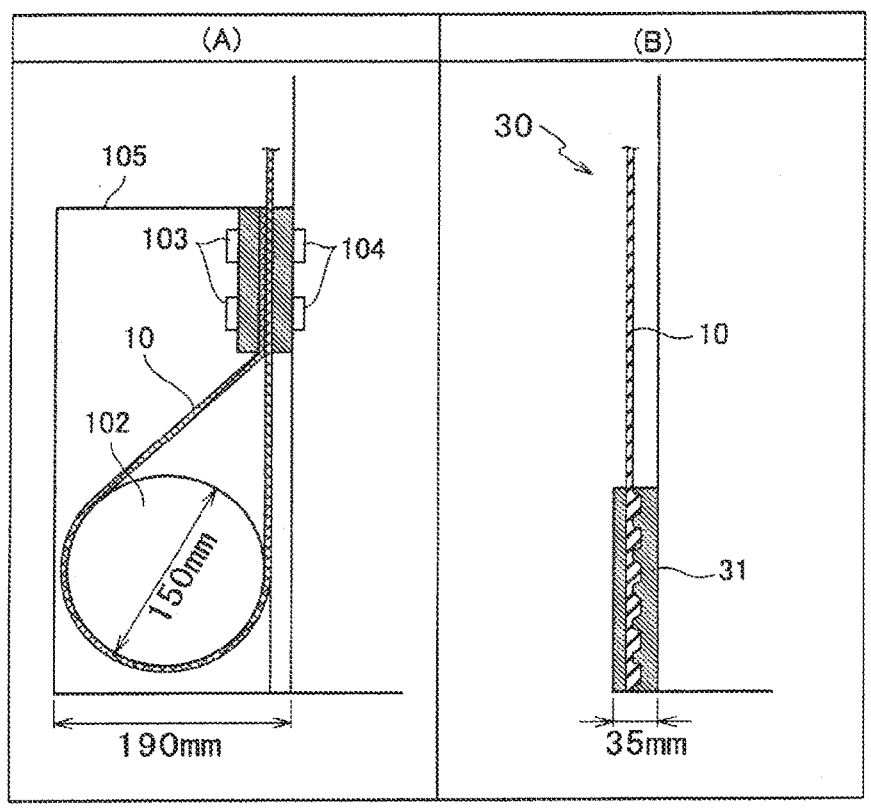

[FIG. 13]
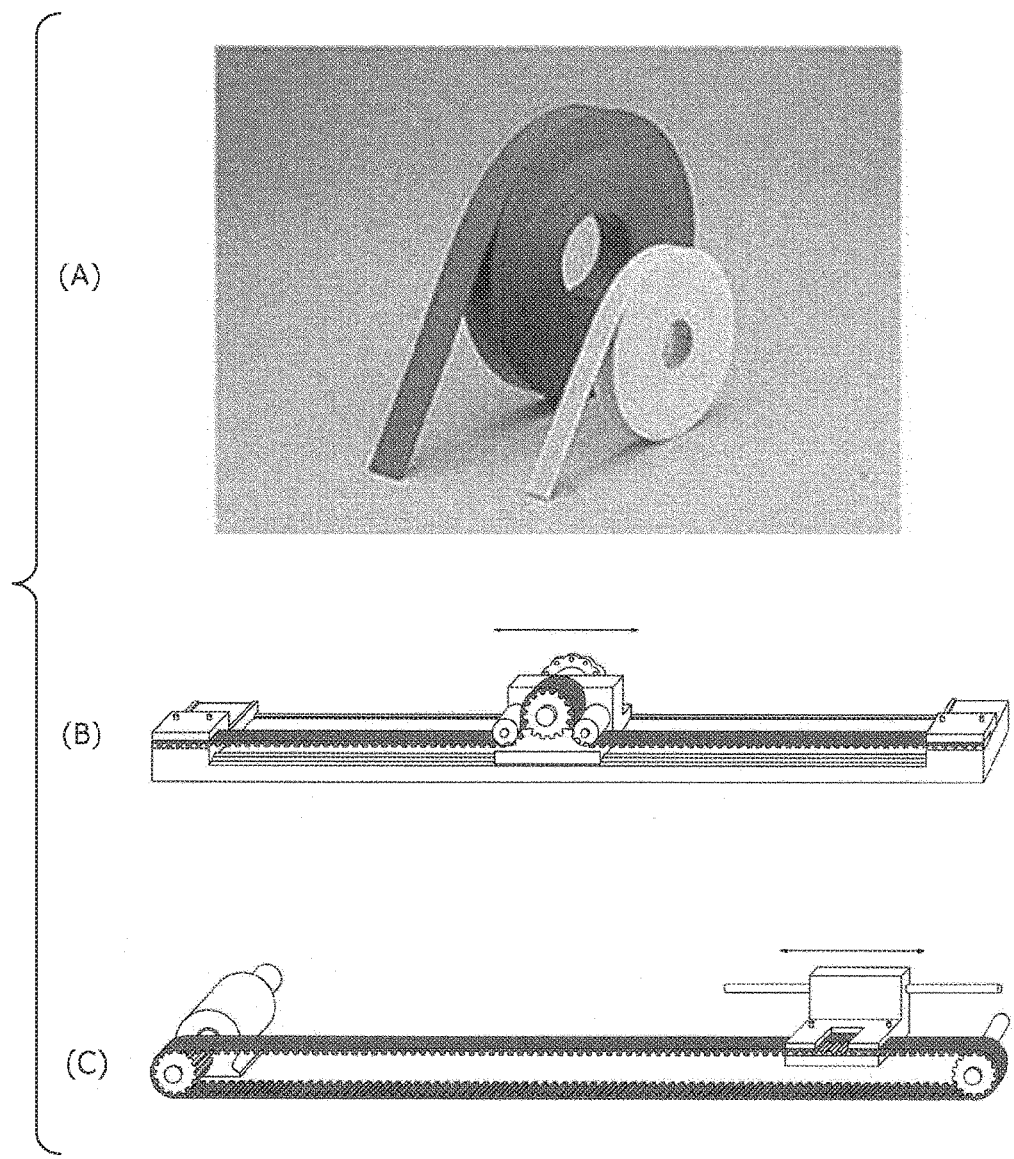

[FIG. 14]
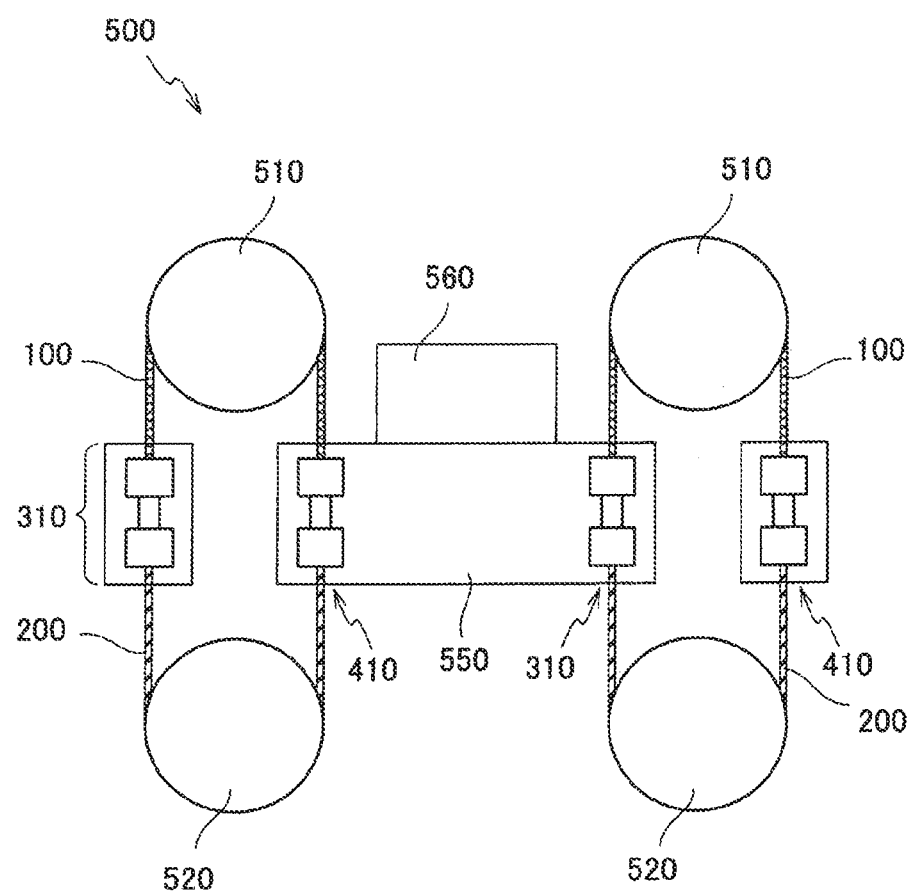

[FIG. 15]
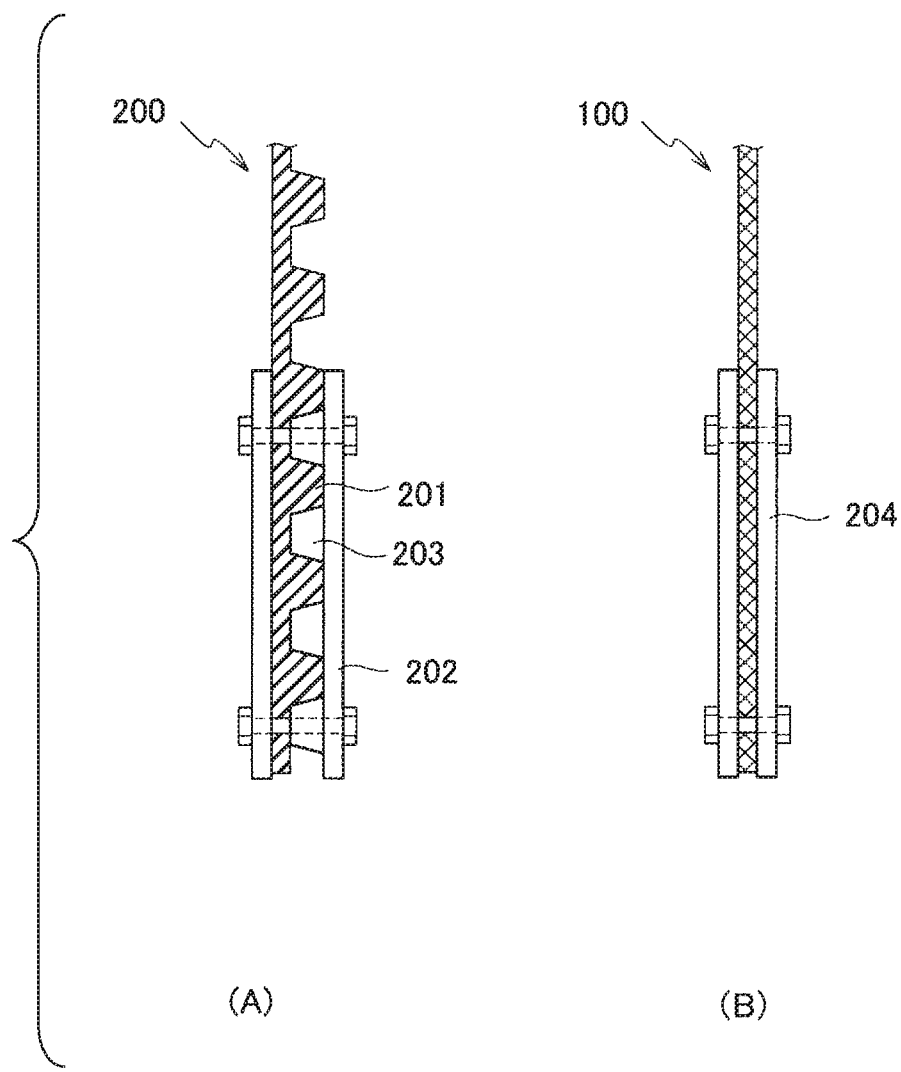
(A)　　　　　(B)

[FIG. 16]
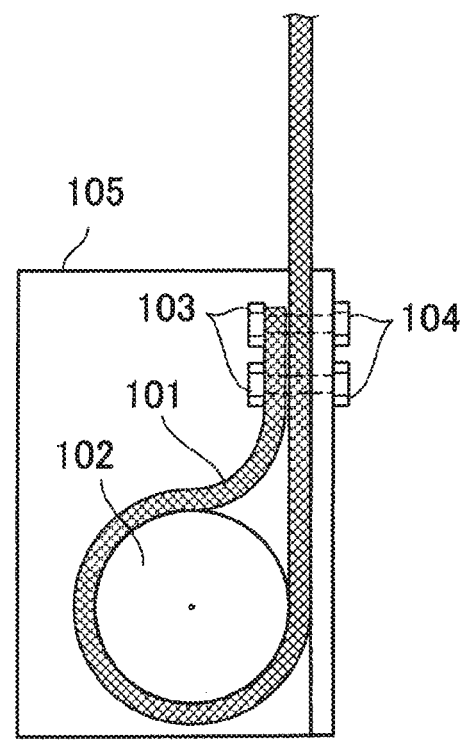

FLAT BELT, BELT MECHANISM, BELT LIFTING MECHANISM, ATTACHMENT METHOD, AND METHOD FOR MANUFACTURING FLAT BELT

CROSS REFERENCE TO RELATED APPLICATIONS

This is a U.S. National Phase Application under 35 U.S.C. § 371 of International Application No. PCT/JP2015/080762, filed Oct. 30, 2015, which claims priority to Japanese Application Nos. 2014-222612, filed Oct. 31, 2014 and 2015-210764, filed Oct. 27, 2015, and which was published Under PCT Article 21(2), the entire contents of which are incorporated herein by reference.

TECHNICAL FIELD

The present invention relates to a flat belt and the like used for transporting an object to be transported.

BACKGROUND ART

As a flat belt or a toothed belt which is used for transmitting power or transporting objects, there is an open end belt (refer to (A) of FIG. 13) having both end portions, in addition to an endless belt having no ends. The endless belt having no ends is annularly formed in a cylindrical mold. On the other hand, since the open end belt having both end portions can be continuously formed by extrusion molding or the like, the length thereof can be freely selected. Use examples of such an open end belt having both end portions include a mechanism (refer to (B) of FIG. 13) in which each of both end portions of an open end belt that is a toothed belt is fixed, a cart or the like having a gear engageable with teeth of the toothed belt is mounted between the end portions, and the cart or the like is caused to reciprocate within a certain area, and a mechanism (refer to (C) of FIG. 13) in which both end portions of an open end belt are connected by means of a connecting member and the connecting member is caused to reciprocate within a certain area.

Another use example of the open end belt includes a lifting and transporting device 500 illustrated in FIG. 14. In the lifting and transporting device 500, use is made of a belt mechanism in which an open end-type flat belt 100 that hangs down from a flat pulley 510 disposed at an upper side and an open end-type toothed belt 200 that meshes with teeth of a toothed pulley 520 disposed at a lower side are combined. In such a belt mechanism, the flat belt 100 and the toothed belt 200 are made into an annular form by fixing and connecting the both ends thereof each other by means of coupler portions 310 and 410. Thus, teeth of the toothed belt 200 are meshed with the teeth of the toothed pulley 520 and the rotation-drive or reverse rotation-drive of the toothed pulley 520, which is a drive pulley, is synchronized to transmit the power to the belt mechanism and an object to be transported 560 put on a loading bed 550 fixed to two of the belt mechanisms is moved up and down.

In the above-mentioned belt mechanism where the both ends of the flat belt 100 and the toothed belt 200 are fixed by means of the coupler portions 310 and 410, in the case of the toothed belt 200, a tooth portions 201 of the toothed belt 200 are fixed by being meshed with a tooth portions 203 formed on a fixing bracket 202 of the coupler portions 310 and 410 as illustrated in (A) of FIG. 15 (e.g., Patent Document 1). In this case, since the tooth portions 201 of the toothed belt 200 are meshed with the tooth portions 203 of the fixing bracket 202, slipping is unlikely to occur on the toothed belt 200. On the other hand, in the case of the flat belt 100, once it is fixed by means of a flat plate-shaped fixing bracket 204 as illustrated in (B) of FIG. 15 (e.g., Patent Document 2), the slipping of the flat belt 100 might occur on the coupler portions 310 and 410 since the flat belt 100 is not meshed with the fixing bracket 204.

Hence, there is a method in which the flat belt 101 is wound around the winding core 102 and the flat belt 101 and a metal cover case 105 are fixed by means of a bolt or the like (e.g., screws 103 and bolts 104) as illustrated in FIG. 16 in order to restrict the slipping in the case of fixing the flat belt to the coupler (e.g., Patent Document 3). In this case, since frictional force is exerted to an extent that the flat belt 101 is wound around the winding core 102, the slipping can be restricted in the case of fixing the flat belt 101 to the coupler portions 310 and 410.

PRIOR ART DOCUMENT

Patent Document

Patent Document 1: JP-U-S61-082153
Patent Document 2: JP-U-S52-133487
Patent Document 3: JP-A-H08-40669

SUMMARY OF THE INVENTION

Problems that the Invention is to Solve

However, in the above-mentioned method of winding the flat belt around the winding core, a space at least equivalent to the diameter of the winding core is required and thus the size of the metal cover case (coupler) that contains the winding core ends up being increased. Thus, the method is ineffective in terms of space saving and weight reducing.

It is considered to achieve space saving by decreasing the diameter of the winding core, but the curvature of the flat belt wound around the winding core ends up being increased in the case where the diameter of the winding core is decreased. In order to increase the curvature of the flat belt, a small (narrow) tension member is required to be used as that embedded in a circumferential direction to reinforce the flat belt, and this results in a decline in the strength of the flat belt. Accordingly, decreasing the diameter of the winding core has its limits.

The present invention has been made in order to solve the above-mentioned problems, and an object thereof is to provide a flat belt and the like that can achieve downsizing while restricting the slipping when fixing the flat belt to a coupler.

Means for Solving the Problems

An embodiment of the present invention to solve the above-mentioned problems is a flat belt that is an open end belt to be fixed to a coupler, in which the flat belt has, formed on both end portions of at least one surface thereof, a plurality of projected portions engageable with a plurality of recessed portions formed on the coupler.

According to the above-mentioned configuration of the flat belt, the flat belt can be firmly fixed to the coupler since the plurality of projected portions formed on the both end portions are fixed to the coupler by being engaged with the plurality of recessed portions formed on the coupler.

In addition, in an embodiment of the present invention, in the aforementioned flat belt, the flat belt includes:

a flat belt main body portion, and the plurality of projected portions provided on the both end portions of at least one surface of the belt main body portion, in which the belt main body portion is formed of a thermoplastic urethane, and contains a tension member embedded in a circumferential direction.

According to the above-mentioned configuration, the flat belt can be improved in durability.

In addition, in an embodiment of the present invention, in the aforementioned flat belt, the flat belt includes:

a flat belt main body portion, and the plurality of projected portions provided on the both end portions of at least one surface of the belt main body portion, in which the projected portions are formed of the same material as the belt main body portion.

According to the above-mentioned configuration, manufacturing costs can be reduced by forming the projected portions of the same material as the belt main body portion.

In addition, another embodiment of the present invention is a belt mechanism that is to be wound between a flat pulley and a toothed pulley provided with a plurality of tooth portions on the outer circumference thereof, in which the belt mechanism contains the one aforementioned flat belt, other n−1 (here, n is an integer of 2 or more) open end belts and n couplers, one end of the flat belt is engaged with one end of a first coupler, one end of a first other open end belt is engaged with the other end of the first coupler, sequentially, one end of a n−1st other open end belt is engaged with the other end of a n−1st coupler, the other end of the n−1st other open end belt is engaged with one end of a nth coupler, and the other end of the nth coupler is engaged with the other end of the flat belt, to form a loop, each of the n−1 other open end belts is independently a flat belt or a toothed belt, at least one belt selected from the group consisting of the flat belt and the n−1 other open end belts has, on at least a part of at least one surface thereof, a plurality of projected portions meshable with the plurality tooth portions of the toothed pulley, and the one end of the first coupler and the other end of the nth coupler that engage with the flat belt have a plurality of recessed portions engageable with the plurality of projected portions of the flat belt.

According to the above-mentioned configuration, when annularly connecting the flat belt, which is an open end belt according to the present invention, and a toothed belt, which is an open end belt, the flat belt and the toothed belt can be annularly and firmly connected by making the projected portions formed on the both end portions of the flat belt, which is an open end belt according to the present invention, engage with the recessed portions formed on the coupler that engages with the flat belt, which is an open end belt according to the present invention.

In addition, since there are the plurality of both of the projected portions of the flat belt, which is an open end belt according to the present invention, and the recessed portions of the coupler that engages with the flat belt, which is an open end belt according to the present invention, the circumference of the annular belt mechanism can be finely adjusted by sifting positions at which the projected portions engage with the recessed portions.

In addition, still another embodiment of the present invention is a belt mechanism that is to be wound between a plurality of pulleys, in which the belt mechanism may be a belt mechanism containing the aforementioned flat belt and one coupler, and one end of the flat belt is engaged with one end of the coupler and the other end of the flat belt is engaged with the other end of the coupler, to form a loop, and the one end and the other end of the coupler engaging with the flat belt have a plurality of recessed portions engageable with the plurality of projected portions of the flat belt.

According to the above-mentioned configuration, when the flat belt, which is an open end belt, is made annular, the both end portions of the flat belt can be firmly fixed to the coupler since the plurality of projected portion formed on the both end portions of the flat belt are fixed to the coupler by being engaged with the plurality of recessed portions formed on the coupler.

In addition, since there are the plurality of each of the projected portions of the flat belt and the recessed portions of the coupler, the circumference of the annular belt mechanism can be finely adjusted by shifting positions at which the projected portions engage with the recessed portions.

In addition, in an embodiment of the present invention, in the aforementioned belt mechanism, n may be 2.

According to the above-mentioned configuration where n is 2, when annularly connecting the flat belt, which is an open end belt according to the present invention, and a toothed belt, which is an open end belt, the flat belt and the toothed belt can be annularly and firmly connected by making the projected portions formed on each of the both end portions of the flat belt, which is open end belt according to the present invention, and the toothed belt engage with the recessed portions formed on the first coupler and the second coupler.

In addition, since there are the plurality of both of the projected portions of the flat belt, which is open end belt according to the present invention, and the toothed belt and the recessed portions of the first coupler and the second coupler that engage with the flat belt, which is an open end belt according to the present invention, the circumference of the annular belt mechanism can be finely adjusted by shifting positions at which the projected portions engage with the recessed portions.

In addition, in an embodiment of the present invention, in the aforementioned belt mechanism, at least one of the couplers may be separable in the circumferential direction of the belt mechanism, and at least one of the couplers may be a coupler of which one end and the other end are connected by means of a separate member.

According to the above-mentioned configuration, the belt mechanism can be easily provided between the plurality of pulleys. In addition, the circumference of the belt can be easily adjusted in accordance with the configuration of the provided pulleys.

In addition, still another embodiment of the present invention is a belt-lifting mechanism that contains:

the aforementioned belt mechanism wound between a flat pulley and a toothed pulley provided with a plurality of tooth portions on the outer circumference thereof, the flat pulley, and the toothed pulley, in which the flat pulley is a driven pulley, the toothed pulley is a drive pulley disposed below the flat pulley, and the flat belt of the belt mechanism is wound around the flat pulley, the toothed belt of the belt mechanism is wound around the toothed pulley, and the belt mechanism moves up and down and goes around by the normal rotation-drive or reverse rotation-drive of the toothed pulley.

According to the above-mentioned configuration, the belt mechanism in which the flat belt and the toothed belt are annularly and firmly connected is wound between a flat pulley and a toothed pulley and the toothed pulley is normal or reverse rotation-driven. And thus, the belt mechanism goes around in a normal or reverse rotation direction and the belt mechanism can move up and down and go around between the flat pulley and the toothed pulley.

In addition, still another embodiment of the present invention is a mounting method for fixing the aforementioned flat belt to the coupler, in which the coupler has two thin plate-shaped members of which a width is larger than the width of the flat belt, and the mounting method for fixing the flat belt to the coupler contains:

an engaging step of engaging the plurality of projected portions formed on the flat belt with the plurality of recessed portions formed on at least one of the members and causing the flat belt to be sandwiched by the two members so that the middle of the flat belt in a width direction is disposed substantially in the middle of the members in the width direction, and a fixing step of fixing the two members in a state where the flat belt is sandwiched.

According to the above-mentioned method, since the plurality of projected portions formed on the flat belt are engaged with the plurality of recessed portions formed on the member in the engaging step, the flat belt can be interposed between the two members and be positioned (temporarily fixed) in the middle of the members in the width direction as a preparatory stage before fixing the coupler in the fixing step. That is, since the flat belt is positioned (temporarily fixed) in the middle of the two members in the width direction in the engaging step, the coupler can be precisely fixed in the fixing step.

In addition, in an embodiment of the present invention, the aforementioned mounting method further contains a communicating step of forming communication-holes in the two members, which communicate at opposing positions without going through the flat belt, in which a communication member may be inserted into the communication-holes and fixes the two members in the fixing step. In addition, the communication member may be a screw, and the two members may be fixed by inserting the screw into the communication-holes and being screwed with a bolt.

In addition, still another embodiment of the present invention is:

a method for manufacturing the aforementioned flat belt, in which the plurality of projected portions of the flat belt are formed by a cutting forming, an injection molding, or a continuous molding.

According to the above-mentioned method, the projected portions can be precisely formed on both end portions of the flat belt.

In addition, still another embodiment of the present invention is:

a method for manufacturing the aforementioned flat belt, in which the flat belt contains:

the flat belt main body portion, and the plurality of projected portions provided on both end portions of at least one surface of the belt main body portion, and the plurality of projected portions are bonded to the belt main body portion by welding.

According to the above-mentioned method, the belt main body portion and the plurality of projected portions can be separately produced.

In addition, still another embodiment of the present invention is:

a method for manufacturing the aforementioned flat belt, in which the flat belt contains:

a flat belt portion, which is flat, and a projected belt portion on which the plurality of projected portions are formed on at least one surface thereof, and the flat belt portion and the projected belt portion are spliced together and bonded.

According to the above-mentioned method, the flat belt portion and the projected belt portion can be separately produced.

Advantageous Effect of the Invention

The flat belt and the like that can achieve downsizing while restricting slipping at the time of fixing the flat belt to a coupler can be provided.

BRIEF DESCRIPTION OF DRAWINGS

FIG. 1 is a view illustrating a flat belt according to the present embodiment, (A) of FIG. 1 is a bottom view, and (B) of FIG. 1 is a side view.

FIG. 2 is a view illustrating a toothed belt according to the present embodiment, (A) of FIG. 2 is a bottom view, and (B) of FIG. 2 is a side view.

FIG. 3 is a view illustrating a belt mechanism according to the present embodiment, (A) of FIG. 3 is a top view of a coupler portion, (B) of FIG. 3 is a side view of the coupler portion, and (C) of FIG. 3 is an overall view of the belt mechanism.

FIG. 4 is a view illustrating a coupler according to the present embodiment, (A) of FIG. 4 is a view illustrating an upper plate of the coupler ((A1): upper and lower surfaces, (A2): side surface, and (A3): front surface), (B) of FIG. 4 is a view illustrating a lower plate of the coupler ((B1): upper surface, (B2): lower surface, (B3): side surface, and (B4): front surface), and (C) of FIG. 4 is a view illustrating the flat belt and the toothed belt that are engaged with the upper surface of the lower plate.

FIG. 5 is a view illustrating a lifting and transporting device according to the present embodiment.

FIG. 6 is a view illustrating heat press welding.

FIG. 7 is a view illustrating high frequency welding.

FIG. 8 is a view collectively illustrating shapes of tooth portions of the flat belt according to the present embodiment.

(A) to (C) of FIG. 9 are views illustrating a method for forming the flat belt according to the present embodiment.

FIG. 10 is a schematic view of a tooth shear force measuring device used for comparing tooth shear forces.

FIG. 11 is a view illustrating summarized results of a running test of the belt mechanism.

FIG. 12 is a view in which a conventional art is compared to the present invention.

(A) to (C) of FIG. 13 are views illustrating open end belts having both end portions.

FIG. 14 is a view illustrating a lifting and transporting device of a conventional art.

(A) and (B) of FIG. 15 are views illustrating methods for bonding a toothed belt and a flat belt of a conventional art.

FIG. 16 is a view illustrating a method for bonding a flat belt of a conventional art.

MODE FOR CARRYING OUT THE INVENTION

Embodiment

Hereinafter, embodiments of a flat belt 10, a belt mechanism 30, a lifting and transporting device 50, and the like according to the present invention will be described with reference to the drawings. As illustrated in FIG. 1, the flat belt 10 is an open end belt that has both end portions. In addition, as illustrated in FIG. 3, the belt mechanism 30 contains the flat belt 10 and a toothed belt 20 (refer to FIG. 2) annularly connected to each other via couplers 31 and 41. In addition, as illustrated in FIG. 5, the lifting and transporting device 50 is configured such that the belt mechanism 30 is wound between a flat pulley 51 disposed on an upside and a toothed pulley 52 disposed on a downside.

(Flat Belt 10)

As illustrated in FIG. 1, the flat belt 10 is an open end belt having end portions 11 and 12, and has a long and thin belt main body portion 14 and has six projected tooth portions 13 (correspond to projected portions) provided respectively on an inner surface 16 of end portions 11 and 12 of the belt main body portion 14.

The belt main body portion 14 has a long and thin shape of, for example, 3.5 m in length, 13 mm in width and 4 mm in thickness, and is formed of a thermoplastic urethane. In the belt main body portion 14 of the present embodiment, four core-like steel cords 15 (correspond to tension members) having a diameter of 2.5 mm are embedded in a longitudinal direction of the belt main body portion 14. A back surface 17 of the belt main body portion 14 has a planar shape. On the other hand, on an inner surface 16 of the belt main body portion 14, the six tooth portions 13 are provided respectively for the end portions 11 and 12 while no tooth portion 13 is provided between the end portion 11 and the end portion 12 to be a planar shape.

As illustrated in FIG. 1, the tooth portion 13 has a trapezoidal shape in a side view in which a lower bottom 13b that is longer than an upper bottom 13a is disposed on the inner surface 16 side of the belt main body portion 14. In the present embodiment, the six tooth portions 13 provided on each of the end portions 11 and 12 are disposed so as to be adjacent to each other at a tooth pitch of 20 mm. The tooth portions 13 are provided so as to be meshed with tooth portions 33 and 43 provided on the couplers 31 and 41 that will be described later.

In addition, in the present embodiment, the tooth portion 13 is formed of a thermoplastic urethane as in the belt main body portion 14. Thermoplastic urethane having a hardness of from 88 to 97 A is used therefor. A tensile strength and a modulus can be increased when the hardness of the tooth portion 13 is raised. For example, when a case where the tooth portion 13 has a hardness of from 88 to 93 A is compared to a case where the tooth portion 13 has a hardness of from 95 to 97 A, the tensile strength and the modulus in the case where the tooth portion 13 has a hardness of from 95 to 97 A are approximately 1.5 times higher compared to the case where the tooth portion 13 has a hardness of from 88 to 93 A. Accordingly, it become possible to enhance strength attributable to the meshing of the tooth portions 13 and the tooth portions 33 and 43 in the couplers 31 and 41, and to reduce the size (length) of the couplers 31 and 41 (to decrease space) led by reduction in the number of the tooth portions 13 and the number of tooth portions 33 and 43 that will be meshed with each other. Material compositions for the tooth portion 13 and the belt main body portion 14 may be a rubber, a urethane or a resin, or material compositions may be different from each other, insofar as welding is possible.

In the present embodiment, the shape of the tooth portion 13 is a trapezoidal shape (refer to FIG. 8) in a cross-sectional view. Without being limited thereto, however, it may be a quadrilateral shape (square or rectangle: refer to FIG. 8), a triangular shape, or a semicircular shape, or may be a helical tooth shape in a cross-sectional view. In addition, in the case where the tooth portion 13 has a trapezoidal shape, the upper bottom 13a that is shorter than the lower bottom 13b may be disposed on the inner surface 16 side of the belt main body portion 14, opposite to the present embodiment. In addition, it is preferable that the tooth portion 13 has a size of from 2 to 30 mm in a length direction of the belt and from 1.5 mm to 20 mm in a thickness direction, but it may be changed according to the shape and size of the flat belt 10. The tooth portions 33 and 43 of the couplers 31 and 41 are formed in shapes corresponding to the tooth portion 13.

In the present embodiment, the flat belt 10 may have the belt main body portion 14 configured to have a multi-layered structure, or may have the back surface 17 covered with a canvas. In addition, the belt main body portion 14 may be configured to have noses provided in the longitudinal direction on the inner surface 16 side at a certain interval in a belt width direction, and the steel cord 15 may be exposed from the noses.

In addition, although the tooth portions 13 are formed on the both end portions 11 and 12 of one surface side (inner surface 16) of the belt main body portion 14 in the present embodiment, they may be provided on a back surface 17 side of the belt main body portion 14, or may be provided on the end portions 11 and 12 of both surfaces (inner surface 16 and back surface 17) of the belt main body portion 14 as illustrated in FIG. 8.

(Toothed Belt 20)

As illustrated in FIG. 2, the toothed belt 20 is an open end belt having both ends, and has a long and thin belt main body portion 24 and a plurality of tooth portions 23 provided on an inner surface 26 of the belt main body portion 24.

The belt main body portion 24 has a long and thin shape of, for example, 3.5 m in length, 13 mm in width and 4 mm in thickness, and is formed of a thermoplastic urethane. In the belt main body portion 24 of the present embodiment, four core-like steel cords 25 (correspond to tension members) having a diameter of 2.5 mm are embedded in a longitudinal direction of the belt main body portion 24. A back surface 27 of the belt main body portion 24 has a planar shape. On the other hand, in the present embodiment, on the inner surface 26 of the belt main body portion 24, the plurality of projected tooth portions 23 disposed at a tooth pitch of 20 mm so as to be adjacent to each other are formed.

As illustrated in FIG. 2, the tooth portion 23 has a trapezoidal shape in a side view in which a lower bottom 23b that is longer than an upper bottom 23a is disposed on the inner surface 26 side of the belt main body portion 24. The tooth portions 23 formed on both end portions 21 and 22 of the belt main body portion 24 mesh with the tooth portions 33 and 43 provided on the couplers 31 and 41 that will be described later, and the tooth portion 23 formed between the end portion 21 and the end portion 22 of the belt main body portion 24 mesh with tooth portions provided on the outer circumference of the toothed pulley 52. In addition, in the present embodiment, the tooth portion 23 is formed of a thermoplastic urethane as in the belt main body portion 24.

In the present embodiment, for the toothed belt 20, a thermoplastic urethane is adopted as its material compositions but it is not particularly limited to rubber, urethane, resin, and the like. In addition, the belt main body portion 24 may be configured to have a multi-layered structure, or the back surface 27 may be covered with a canvas. In addition, the belt main body portion 24 may be configured to have noses provided in the longitudinal direction on the inner surface 26 side at a certain interval in a belt width direction, and the steel cord 25 may be exposed from the noses.
(Belt Mechanism 30)

As illustrated in FIG. 3, the belt mechanism 30 is configured to annularly connect the flat belt 10 and the toothed belt 20 via the coupler 31 (corresponds to a first coupler) and the coupler 41 (corresponds to a second coupler).

As illustrated in FIG. 4, the couplers 31 and 41 contain upper plates 34 and 44 (correspond to one of two metal plates), which are thin plates made of metal, and lower plates 32 and 42 (correspond to one of the two metal plates) on which the tooth portions 33 and 43 meshing and engaging with the tooth portions 13 of the flat belt 10 and the tooth portions 23 of the toothed belt 20 are formed.

As illustrated in FIG. 4, the upper plates 34 and 44 have a thin plate shape of, for example, 260 mm in length a, 57 mm in width b, and 10 mm in thickness c. In the upper plates 34 and 44 of the present embodiment, six communication-holes 34a to 34f and 44a to 44f having a diameter of 11 mm are provided at a predetermined interval in the length direction in a line from one side surface with an interval of 4.5 mm in the width direction, and six communication-holes 34g to 34l and 44g to 44l having a diameter of 11 mm are provided at a predetermined interval in the length direction in a line from the other side surface with an interval of 4.5 mm in the width direction. That is, in the present embodiment, a center-to-center distance d between two communication-holes (e.g., 34a and 34g) corresponding in the width direction is 37 mm.

As illustrated in FIG. 4, the lower plates 32 and 42 contain lower plate main body portions 32x and 42x having a thin plate shape of, for example, 260 mm in length e, 57 mm in width f, and 20 mm in thickness g, and thereon, fourteen tooth portions 33 and 43 having a tooth height of 5 mm formed at a tooth pitch of 20 mm. In the lower plates 32 and 42 of the present embodiment, six communication-holes 32a to 32f and 42a to 42f having a diameter of 11 mm are provided at a predetermined interval in the length direction in a line from one side surface with an interval of 4.5 mm in the width direction, and six communication-holes 32g to 32l and 42g to 42l having a diameter of 11 mm are provided at the predetermined interval in the length direction in a line from the other side surface with an interval of 4.5 mm in the width direction. That is, in the present embodiment, a center-to-center distance h between two communication-holes (e.g., 32a and 32g) corresponding in the width direction is 37 mm.

In the present embodiment, the upper plates 34 and 44 and the lower plates 32 and 42 have a width of 57 mm and the flat belt 10 and the toothed belt 20 have a width of 13 mm, and thus the upper plates 34 and 44 and the lower plates 32 and 42 have a width larger than the width of the flat belt 10. That is to secure a space in which the flat belt 10 and the toothed belt 20 do not overlap the communication-holes 34a to 34l and the communication-holes 32a to 32l in the case where the flat belt 10 and the toothed belt 20 are interposed between the upper plate 34 and the lower plate 32 and fixed by screws 36 and bolts 35 for example. Accordingly, the flat belt 10 and the toothed belt 20 can be interposed and fixed between the upper plate 34 and the lower plate 32 without providing a hole through which the screw penetrates in the flat belt 10 and the toothed belt 20. Since the hole through which the screw penetrates is not formed in the flat belt 10 and the toothed belt 20, a risk of a crack widening from the hole can be prevented.

The flat belt 10 is disposed in a state where the six tooth portions 13 formed on the end portion 11 mesh with the seven tooth portions 33 formed on one end portion 32y of the lower plate 32 of the coupler 31 and the six tooth portions 13 formed on the end portion 12 mesh with the seven tooth portions 43 formed on one end portion 42y of the lower plate 42 of the coupler 41 (refer to FIG. 3 and FIG. 4).

Meanwhile, the toothed belt 20 is disposed in a state where the six tooth portions 23 formed on the end portion 22 mesh with the seven tooth portions 33 formed on one end portion 32z of the lower plate 32 of the coupler 31 and the six tooth portions 23 formed on the end portion 21 mesh with the seven tooth portions 43 formed on one end portion 42z of the lower plate 42 of the coupler 41 (refer to FIG. 3 and FIG. 4).

The upper plate 34 is placed so as to oppose the lower plate 32 in a state where the tooth portion 13 formed on the end portion 11 of the flat belt 10 and the tooth portion 23 formed on the end portion 22 of the toothed belt 20 mesh with the tooth portion 33 of the lower plate 32 of the coupler 31 as described above. In addition, the communication-holes 34a to 34l provided in the upper plate 34 is disposed at a position opposing the communication-holes 32a to 32l formed in the lower plate 32, respectively. The screws 36 are fixed by passing through the communication-holes 34a to 34l and the communication-holes 32a to 32l from an upper plate 34 side and being screwed with the bolts 35 disposed on a lower plate 32 side.

Similarly, the upper plate 44 is disposed so as to oppose the lower plate 42 in a state where the tooth portions 13 formed on the end portion 12 of the flat belt 10 and the tooth portions 23 formed on the end portion 21 of the toothed belt 20 mesh with the tooth portions 43 of the lower plate 42 of the coupler 41 as described above. In addition, the communication-holes 44a to 44l provided in the upper plate 44 are disposed at positions opposing the communication-holes 42a to 42l formed in the lower plate 42, respectively. The screws 46 are fixed by passing through the communication-holes 44a to 44l and the communication-holes 42a to 42l from an upper plate 44 side and being screwed with the bolts 45 disposed on a lower plate 42 side.
(Lifting and Transporting Device 50 Provided with Belt-Lifting Mechanisms 50a and 50b)

As illustrated in FIG. 5, the lifting and transporting device 50 has two belt-lifting mechanisms 50a and 50b, each of which contains a flat pulley 51 that is a driven pulley disposed on the upside, a toothed pulley 52 that is a drive pulley disposed on the downside and the belt mechanisms 30 wound therebetween, and a loading bed 55 on which an object 56 to be transported is placed is mounted between the coupler 41 of the belt-lifting mechanism 50a and the coupler 31 of the belt-lifting mechanism 50b.

In addition, tooth portions that mesh with the tooth portions 23 provided on the toothed belt 20 of the belt mechanism 30 are provided on the outer circumference of the toothed pulley 52, and the toothed pulley 52 rotates in a normal rotation direction (clockwise rotation: corresponds to a normal rotation-drive, an arrow R in the figure) and in a reverse rotation direction (counterclockwise rotation: corresponds to a reverse rotation-drive, arrow L in the figure) by a drive force generated by a drive device such as a stepping motor. Then, the loading bed 55 is lifted by synchronously rotating the rotation of the toothed pulley 52 of the belt-lifting mechanism 50a in the reverse rotation direction and the rotation of the toothed pulley 52 of the belt-lifting mechanism 50b in the normal rotation direction. On the other hand, the loading bed 55 is lowered by synchronously rotating the rotation of the toothed pulley 52 of the belt-lifting mechanism 50a in the normal rotation direction and the rotation of the toothed pulley 52 of the belt-lifting mechanism 50b in the reverse rotation direction. Accordingly, an upward and downward transporting of the object 56 to be transported is possible.

(Method for Forming Tooth Portion 13 of Flat Belt 10)

Examples of a method for forming the tooth portions 13 provided on the flat belt 10 include a cutting forming in which a tooth shape is formed by cutting by means of a cutting plotter or a water jet, and a method in which only the tooth portions 13 are formed and then are bonded to the belt main body portion 14, such as an injection molding in which the tooth portions 13 are formed by means of a mold having a tooth portion shape. In addition, a continuous molding in which the plurality of tooth portions 13 are formed continuously by a rotocure system and are cut so as to have a length such that arbitrary number of tooth portions are included, is also employable.

Example of a method for bonding the tooth portions 13 to the belt main body portion 14 include, as illustrated in FIG. 6, a heat press welding in which the tooth portions 13 are welded to the inner surface 16 of the belt main body portion 14 by disposing a mold 302 on a hot plate 301, putting the tooth portions 13 on tooth-shaped grooves provided in the mold 302, putting the belt main body portion 14 and a mold 303 thereon, and pressing a hot plate 304 from the upside (an arrow P in the figure).

In addition, other examples of the method for bonding the tooth portions 13 to the belt main body portion 14 include, as illustrated in FIG. 7, a high frequency welding in which the tooth portions 13 are welded to the belt main body portion 14 by fitting the belt main body portion 14 into a mold 306 placed on the base 305, and causing the tooth portion 13, which is held by a holder 308, to emit heat by the effect of an electric field of high frequency energy generated from a high frequency welding machine 307.

In the present embodiment, the heat press welding is performed as the method for bonding the tooth portions 13 to the belt main body portion 14. Specifically, as illustrated in FIG. 9, first, the six tooth portions 13 formed by the cutting forming are disposed into six grooves (tooth-shaped grooves corresponding to the tooth portions 13) 309 formed in the mold 302 placed on the hot plate 301 ((A) of FIG. 9). Next, the end portion 11 of the belt main body portion 14 is placed (at a tooth pitch of 20 mm) onto the six tooth portions 13 disposed in the six grooves 309 formed in the mold 302 ((B) of FIG. 9). Then, the flat plate-shaped mold 303 is put onto the belt main body portion 14, the heat press welding (pressing direction: the arrow P in the figure), in which a hot plate 304 is pressed from the upside, is performed ((C) of FIG. 9) under press conditions (set temperature of the hot plate is 190° C., heating time is 8 minutes, and pressure is 0.3 MPa), and the tooth portions 13 are formed onto the end portion 11 of the flat belt 10 ((D) of FIG. 9). The case where the tooth portions 13 are welded to one end portion 11 of the flat belt 10 has been described above, and similar to the aforementioned case, the tooth portions 13 are welded to the other end portion 12 of the flat belt 10.

(Comparison of Tooth Shear Force)

Next, as illustrated in FIG. 10, the tooth shear force of the tooth portion 13 of the flat belt 10 according to the present embodiment, which is formed by the heat press welding, was measured. Specifically, the tooth portions 13 of the flat belt 10 were meshed with tooth portions 91 of a tooth shear force measuring device 90, and the flat belt 10 was sandwiched at a pressure of belt tightening torque of 1 kgf·cm (per 1 mm of belt width). Then, the flat belt 10 was pulled upward at a belt tensile speed of 50 mm/min, and the tooth shear force of the tooth portion 13 formed on the flat belt 10 was measured. As a result, the tooth shear force of the tooth portion 13 of the flat belt 10 according to the present embodiment was shown as 3.9 kN/20 mm, which is approximately the same value as a reference value (3.8 kN/20 mm) capable of withstanding while in use.

(Method for Manufacturing Belt Mechanism 30)

Next, a method for manufacturing the belt mechanism 30 will be described.

First, a method for manufacturing the couplers 31 and 41 will be described. Since the structures of the coupler 31 and the coupler 41 are the same, only the coupler 31 will be described.

The upper plate 34 can be molded by pouring melted metal into a mold (refer to FIG. 4). In addition, the lower plate 32 can be molded by pouring melted metal into a mold that is hollowed out so as to have a pattern such that the tooth portions 33 are formed in the lower plate 32 (refer to FIG. 4).

The communication-holes 32a to 32l and the communication-holes 34a to 34l are formed in the molded lower plate 32 and upper plate 34 by means of a drill or the like so as to be disposed at positions opposing each other (communicating step).

A pattern corresponding to the communication-holes 34a to 34l may be formed in the mold for the upper plate 34 in advance to form the communication-holes 34a to 34l in molded the upper plate 34. Similarly, a pattern corresponding to the communication-holes 32a to 32l may be formed in the mold for the lower plate 32 in advance to form the communication-holes 32a to 32l in the molded lower plate 32. In this case, the patterns are formed in the lower plate 32 and the upper plate 34 such that the communication-holes 32a to 32l and the communication-holes 34a to 34l are disposed at positions opposing each other (communicating step).

The upper plates 34 and 44 and lower plates 32 and 42 of the couplers 31 and 41 can be manufactured by the above step.

Next, as illustrated in FIG. 3 and FIG. 4, the flat belt 10 is disposed in a state where the six tooth portions 13 formed on the end portion 11 mesh with the seven tooth portions 33 formed on one end portion 32y of the lower plate 32 of the coupler 31 and the six tooth portions 13 formed on the end portion 12 mesh with the seven tooth portions 43 formed on one end portion 42y of the lower plate 42 of the coupler 41, such that the middle of the flat belt 10 in the width direction is disposed in substantially the middle of the lower plate 32.

Meanwhile, as illustrated in FIG. 3 and FIG. 4, the toothed belt 20 is disposed in a state where the six tooth portions 13 formed on the end portion 22 mesh with the seven tooth portions 33 formed on one end portion 32z of the lower plate 32 of the coupler 31 and the seven tooth portions 23 formed on the end portion 21 mesh with the seven tooth portions 43 formed on one end portion 42z of the lower plate 42 of the coupler 41.

After that, the upper plates 34 and 44 are placed onto the flat belt 10 and the toothed belt 20 such that the flat belt 10 and the toothed belt 20 are interposed between the lower plates 32 and 42 and the upper plates 34 and 44 (engaging step).

Incidentally, the communication-holes 32a to 32l and the communication-holes 34a to 34l may be formed in the lower plate 32 and the upper plate 34 by means of a drill or the like after the engaging step (communicating step).

After the above-mentioned engaging step, in the coupler 31, the screws 36 are fixed by passing through the communication-holes 34a to 34l and the communication-holes 32a to 32l from the upper plate 34 side and being screwed with the bolts 35 disposed on the lower plate 32 side (fixing step). Similarly, the coupler 41 is also fixed by being screwed.

Through the above-mentioned steps, the belt mechanism 30 can be manufactured.

(Running Test)

Next, a running test for the belt mechanism 30 of the present embodiment, manufactured through the above-mentioned steps was conducted. Specifically, a toothed belt 20 side of the annular belt mechanism 30 was wound around a toothed pulley 52 (drive pulley, Dr: 32 teeth) side, and a flat belt 10 side was wound around a flat pulley 51 (driven pulley, Dn) side. Under the conditions shown in Table 1, lifting up-and-down (running test) was repeated 300,000 cycles in a state where a weight (CR weight: 163.4 kg) was attached to the coupler 31. The tooth shear force of the belt mechanism 30, the elongation of the flat belt 10, the peeling-off of a welded portion of the tooth portion 13 were evaluated after the test. The results are shown in FIG. 11.

TABLE 1

| Diameter of pulley (Dr, Dn) | CR weight | Number of rotation | Number of clamped teeth |
|---|---|---|---|
| Dr: 216.45 mm (32 teeth)<br>Dn: 216.45 mm (flat) | 163.4 kg | 0 or more rpm (lifting up-and-down) | 6 teeth |

As a result of the running test, a significant difference in the tooth shear force was not found between before and after the running. In addition, a significant elongation was not found in the flat belt 10 after the test (if an elongation occurs, the position of the line 99 moves upward since a flat belt in FIG. 11 is stretched in an up-and-down direction). In addition, a peeling-off of the welded portion of the tooth portion 13 was not found after the test.

(Effect)

According to the flat belt 10 of the above-mentioned present embodiment, the flat belt 10 can be firmly fixed to the couplers 31 and 41 since the six tooth portions 13 formed on each of the both end portions 11 and 12 of the flat belt 10 are fixed to the couplers 31 and 41 by being engaged with the plurality of tooth portions 33 and 43 formed on the couplers 31 and 41.

In addition, according to the belt mechanism 30 of the above-mentioned present embodiment, in the case of annularly connecting the open end flat belt 10 and the open end toothed belt 20, the flat belt 10 and the toothed belt 20 can be annularly and firmly connected by engaging each of the tooth portions 13 and 23 formed on the end portions 11 and 12 and the end portions 21 and 22 of the flat belt 10 and the toothed belt 20 with each of the tooth portions 33 and 43 formed on the coupler 31 and the coupler 41.

In addition, since there are the plurality of tooth portions 13 and 23 of the flat belt 10 and the toothed belt 20 and the plurality of tooth portions 33 and 43 of the couplers 31 and 41, the circumference of the annular belt mechanism 30 can be finely adjusted by shifting positions at which the tooth portions 13 and 23 engage with the tooth portions 33 and 43.

In addition, according to the belt-lifting mechanisms 50a and 50b of the above-mentioned present embodiment, the belt mechanism 30 can move up and down and go around between the flat pulley 51 and the toothed pulley 52 by winding the belt mechanism 30, in which the flat belt 10 and the toothed belt 20 are annularly and firmly connected, between the flat pulley 51 and the toothed pulley 52 and driving the toothed pulley 52 in normal or reverse rotation to make the belt mechanism 30 go around in the normal or reverse rotation direction.

In addition, according to a mounting method for fixing the flat belt 10 to the coupler 31 in the method for manufacturing the belt mechanism 30 of the above-mentioned present embodiment, since the tooth portions 13 formed on the flat belt 10 engage with the tooth portions 33 formed on the lower plate 32 in the engaging step, the flat belt 10 can be interposed between the upper plate 34 and the lower plate 32 and be positioned (temporarily fixed) substantially in the middle of the lower plate 32 in the width direction as a preparatory stage before the screws 36 pass through the communication-holes 32a to 32l and the communication-holes 34a to 34l in the fixing step. That is, since the flat belt 10 is positioned (temporarily fixed) substantially in the middle of the lower plate 32 in the width direction in the engaging step, the screws 36 can precisely pass through the communication-holes 32a to 32l and the communication-holes 34a to 34l and be screwed with the bolts 35 in the fixing step.

In addition, the belt main body portion 14 of the flat belt 10 of the above-mentioned present embodiment is formed of a thermoplastic urethane, and has the steel cord 15 embedded in a circumferential direction. Accordingly, the durability of the flat belt 10 can be improved.

In addition, according to the flat belt 10 of the above-mentioned present embodiment, manufacturing costs can be reduced by forming the tooth portion 13 of a material that is the same as the belt main body portion 14.

In addition, the tooth portions 13 of the flat belt 10 can be precisely formed on the both end portions 11 and 12 of the flat belt 10 by forming the tooth portions 13 by a cutting forming, an injection molding, or a continuous molding.

In addition, in the flat belt 10 of the above-mentioned present embodiment, the belt main body portion 14 and the tooth portion 13 can be separately produced by bonding the tooth portion 13 to the belt main body portion 14 by welding.

In addition, according to the belt mechanism 30 ((B) of FIG. 12) of the above-mentioned present embodiment, as illustrated in FIG. 12, compared to a method of winding the flat belt 10 around a winding core 102 and fixing the flat belt 10 and a metal cover case 105 by means of screws 103 and bolts 104 (refer to Patent Document 3, (A) of FIG. 12), a space substantially equivalent to the diameter of the winding core can be omitted. In addition, the number of components can be cut down in that the winding core can be made unnecessary.

Other Embodiment

The belt mechanism 30 of the above-mentioned embodiment is configured by connecting the flat belt 10 and the toothed belt 20 via the couplers 31 and 41, but is not limited to this configuration.

The belt mechanism of the present invention is a belt mechanism containing one flat belt of the present invention, other n−1 open end belts and n couplers, in which one end of the flat belt is engaged with one end of a first coupler, one end of the first other open end belt is engaged with the other end of a first coupler, sequentially, one end of a n−1st other open end belt is engaged with the other end of a n−1st coupler, the other end of the n−1st other open end belt is engaged with one end of a nth coupler, and the other end of the nth coupler is engaged with the other end of the flat belt, to form a loop, each of the n−1 other open end belts is independently a flat belt or a toothed belt, at least one belt selected from a group consists of the flat belt and the n−1 other open end belts is a toothed belt having, on at least a part of at least one surface thereof, a plurality of projected portions meshable with the plurality of tooth portions of the toothed pulley, and the one end of the first coupler and the other end of the nth coupler that engage with the flat belt have a plurality of recessed portions engageable with the plurality of projected portions of the flat belt.

The belt mechanism 30 in the above-mentioned embodiment corresponds to an embodiment in which n is 2. n may be 1, that is, the belt mechanism may be an annular form in which one end portion 11 of the flat belt 10 is fixed to one end portion 32y of the coupler 31, and the other end portion 12 of the flat belt 10 is fixed to the other end portion 32z of the coupler 31. An upper limit of n is not particularly limited, and, for example, n=5 or so. n is preferably 1 to 3, and 1 or 2 is particularly preferable.

In addition, the belt mechanism of the present invention only has to contain at least one flat belt of the present invention, and may contain a plurality thereof. The belt mechanism of the present invention is particularly preferably if all flat belts contained in the belt mechanism are the flat belt of the present invention. In this case, it is preferable that all couplers have recessed portions engageable with projected portions formed on both end portions of the flat belt of the present invention and the toothed belt. By engaging the projected portions formed on the both end portions of the flat belt of the present invention and the toothed belt with the recessed portions formed on the couplers, the flat belt and the toothed belt can be annularly and firmly connected.

In addition, since there are the plurality of both of the projected portions of the flat belt, which is an open end belt according to the present invention, and the toothed belt and the recessed portions of the couplers engageable therewith, the circumference of the annular belt mechanism can be finely adjusted by shifting positions at which the projected portions engage with the recessed portion.

According to the above-mentioned configuration in which n is 1, when the flat belt 10, which is an open end belt, is made annular, the both end portions 11 and 12 of the flat belt 10 can be firmly fixed to the coupler 31 since the plurality of tooth portions 13 formed on the both end portions 11 and 12 of the flat belt 10 are engaged with the plurality of tooth portions 33 formed on the coupler 31 and are fixed to the coupler 31.

In addition, the circumference of an annular belt mechanism 130 can be finely adjusted by shifting positions at which the tooth portions 13 engage with the tooth portions 33 since there are a plurality of tooth portions 13 of the flat belt 10 and tooth portions 33 of the coupler 31.

A case where the couplers are integrated in the circumferential direction of the belt mechanism has been described in the above-mentioned embodiment, but it is not limited to this. For example, a coupler that is separable in the circumferential direction of the belt mechanism may be adopted, or a coupler of which one end and the other end are connected by means of a separate member may be adopted. In the case where the belt mechanism includes a plurality of couplers, the plurality of couplers may be the same or be different from each other.

By adopting the coupler separable in the circumferential direction of the belt mechanism, the belt mechanism of the present invention can be easily provided between a plurality of pulleys. In addition, by adopting the coupler of which one end and the other end are connected by means of a separate member, the circumference of the belt can be easily adjusted in accordance with a configuration of a pulley to be provided.

Although the case where the tooth portions 13 are welded to the belt main body portion 14 has been described in the above-mentioned embodiment, the flat belt 10 may be one having a flat belt portion of flat form and a projected belt portion (end portions 11 and 12) on which the tooth portions 13 are formed, in which the flat belt portion of flat form and the projected belt portion on which the tooth portion 13 are formed are spliced together and bonded. According to this configuration, the flat belt portion of flat form and the projected belt portion on which the tooth portions 13 are formed can be separately produced.

Although the mounting method in which the coupler including the two thin plates made of a metal is used, has been described in the above-mentioned embodiment, it is not limited to the member made of a metal insofar as a condition required for an environment in which the belt mechanism of the present invention is used is satisfied. In addition, the materials of the two members may be the same or be different from each other.

In addition, although the mounting method for fixing the two members by means of a communication-hole, screw and bolt in the above-mentioned embodiment has been described, it is not limited to this. For example, without forming the communication-hole, the two members in a state where the flat belt is sandwiched therebetween may be fixed from an outer side by means of a band (e.g., made of a metal) or a U-shaped member. In addition, even in the case where the communication-hole is formed, they may be fixed by means of a communication member other than the screw (band (e.g., made of metal), etc.).

While the embodiments of the present invention have been described, the present invention is not limited to the aforementioned embodiments and can be realized after various modifications being made to the extent described in the claims.

The present application is based on Japanese Patent Application No. 2014-222612 filed on Oct. 31, 2014 and Japanese Patent Application No. 2015-210764 filed on Oct. 27, 2015, and the contents thereof are incorporated herein as reference.

DESCRIPTION OF REFERENCE NUMERALS AND SIGNS 10 flat belt
11,12 end portion
13 tooth portion
20 toothed belt
30 belt mechanism
31,41 coupler
33,43 tooth portion
50 lifting and transporting device
50a,50b belt-lifting mechanism

The invention claimed is:

1. A belt mechanism that is to be wound between a flat pulley and a toothed pulley provided with a plurality of tooth portions on the outer circumference thereof,
   wherein the belt mechanism comprises one flat belt, n−1 other open end belts and n couplers, where n is an integer greater than 1,
   wherein the flat belt is an open end belt to be fixed to the coupler, and comprises, formed on both end portions of at least one surface of the flat belt, a plurality of projected portions engageable with a plurality of recessed portions formed on the coupler,
   wherein the plurality of projected portions have a hardness of from 95 to 97 A,
   wherein one end of the flat belt is engaged with one end of a first coupler, one end of a first other open end belt is engaged with the other end of the first coupler, sequentially, one end of a n−1st other open end belt is engaged with the other end of a n−1st coupler, the other end of the n−1st other open end belt is engaged with one end of a nth coupler, and the other end of the nth coupler is engaged with the other end of the flat belt, to form a loop,
   wherein each of the n−1 other open end belts is independently a flat belt or a toothed belt,
   wherein at least one belt selected from the group consisting of the flat belt and the n−1 other open end belts has, on at least a part of at least one surface thereof, a plurality of projected portions meshable with the plurality tooth portions of the toothed pulley, and
   wherein the one end of the first coupler and the other end of the nth coupler that engage with the flat belt have a plurality of recessed portions engageable with the plurality of projected portions of the flat belt.

2. The belt mechanism according to claim 1, wherein n is 2.

3. The belt mechanism according to claim 1, wherein at least one of the n−1 couplers is separable in a circumferential direction of the belt mechanism.

4. The belt mechanism according to claim 1, wherein at least one of the n−1 couplers is a coupler of which one end and the other end are connected by means of a separate member.

5. A belt-lifting mechanism comprising:
   the belt mechanism described in claim 1,
   the flat pulley, and
   the toothed pulley,
   wherein the flat pulley is a driven pulley,
   the toothed pulley is a drive pulley disposed below the flat pulley, and
   the flat belt of the belt mechanism is wound around the flat pulley, the toothed belt of the belt mechanism is wound around the toothed pulley, and the belt mechanism moves up and down and goes around by the normal rotation-drive or reverse rotation-drive of the toothed pulley.

6. A belt mechanism that is to be wound between a plurality of pulleys,
   wherein the belt mechanism comprises a flat belt and one coupler,
   wherein the flat belt is an open end belt to be fixed to the coupler, and comprises, formed on both end portions of at least one surface of the flat belt, a plurality of projected portions engageable with a plurality of recessed portions formed on the coupler,
   wherein the plurality of projected portions have a hardness of from 95 to 97 A, and
   wherein one end of the flat belt is engaged with one end of the coupler and the other end of the flat belt is engaged with the other end of the coupler, to form a loop, and
   the one end and the other end of the coupler engaging with the flat belt have a plurality of recessed portions engageable with the plurality of projected portions of the flat belt.

* * * * *